Patented Oct. 21, 1930

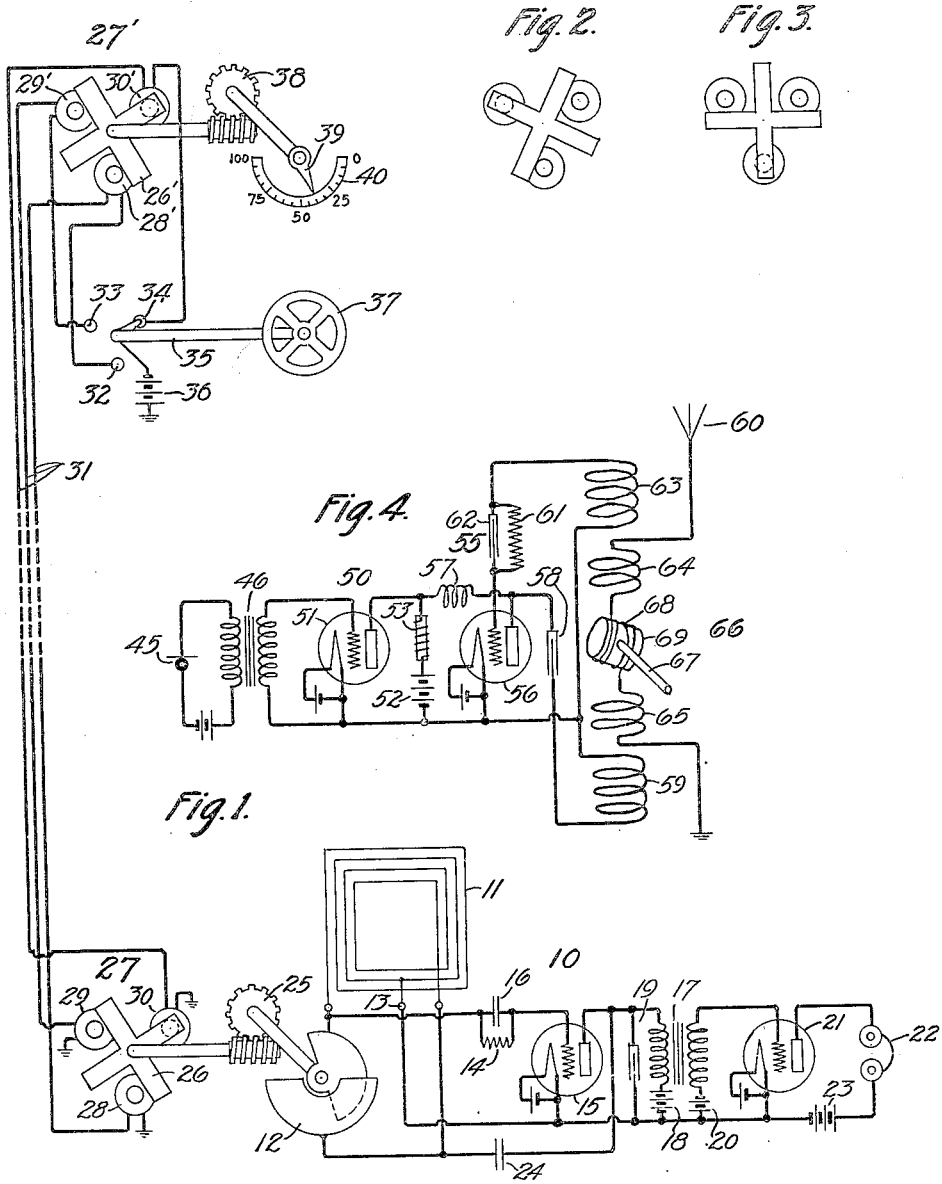

1,778,761

UNITED STATES PATENT OFFICE

RAYMOND A. HEISING, OF MILLBURN, NEW JERSEY, ASSIGNOR TO WESTERN ELECTRIC COMPANY, INCORPORATED, OF NEW YORK, N. Y., A CORPORATION OF NEW YORK

REMOTE CONTROL SYSTEM

Application filed March 3, 1924. Serial No. 696,480.

This invention relates to remote control systems and more particularly to means for the control of radiant energy systems at a distance.

An object of the invention is to provide means for adjusting from a distance the elements of a radiant energy system.

Another object is to provide means whereby an operator may control a variable impedance element or elements in a distant radiant energy system and may obtain a record of the amount of adjustment effected.

A feature of the invention relates to an arrangement of step-by-step motors operated in synchronism to control a variable element included in a radiant energy system and to operate a distant indicating device.

This invention may be applied in practice to control, for example, a variable condenser or inductance forming an element of a tuned circuit in a radiant energy system. The movable plates of the condenser or adjustable element of the inductance may be operated by a worm gear driven by a step-by-step motor which comprises a plurality of electromagnets. The windings of the magnets may be connected to the corresponding windings of a similar motor located at a distant control station for the system. At the control station a rotary switch is provided for closing the circuits of each pair of magnets in succession to cause the synchronous rotation of the motor armatures. The motor at the control station is arranged to drive the pointer of an indicator device. Thus the variable impedance element of the radiant energy system is rotated and the indicator is moved across the dial in front of the operator simultaneously. By proper design of the gears of the system, the movement of the indicator may be caused to have any desired relation to the movement of the condenser plates.

In the drawings, Fig. 1 illustrates the application of the system of this invention to the control of a radiant energy receiving system.

Figs. 2 and 3 illustrate the operation of the step-by-step motors.

Fig. 4 is a radiant energy transmitting system comprising a variometer arranged to be remotely controlled.

The radiant energy system shown in Fig. 1 comprises a loop antenna 11 having its terminals connected to the fixed and movable plates of a condenser 12. A mid-tap 13 on the coil 11 is connected to the cathode of a three-electrode space discharge tube 15 arranged to detect modulated high frequency waves. The control electrode of this tube is connected to one terminal of the antenna 11 in series with a leak path including a resistance 14 and blocking condenser 16.

The tube 15 is provided with an output circuit including the primary winding of the transformer 17 in series with a battery 18 connected between its anode and cathode. A condenser 19 is connected in shunt to the transformer winding and battery 18. The anode of tube 15 is also connected in series with a condenser 24 to the terminal of the antenna 11 opposite to that connected to the control electrode.

The secondary winding of transformer 17 is connected in series with a polarizing battery 20 between the control electrode and cathode of a three-electrode space discharge tube 21 arranged to amplify low frequency waves. Associated with the tube 21 is an output circuit connected to its cathode and anode which contains a receiving device 22 in series with a battery 23.

The movable plates of condenser 12 and connected by worm gear 25 and suitable drive shafts to the rotatable armature 26 of step-by-step motor 27. The motor 27 comprises magnets 28, 29 and 30, the individual windings of which each have one end connected to a return circuit and another to leads 31 extending to the respective windings of magnets 28', 29', and 30', of step-by-step motor 27' located at a distance. The opposite ends of the windings 28', 29', and 30', are connected respectively to contacts 32, 33 and 34 of a rotary switch 35. The arm of this switch is connected through a battery 36 to the return circuit and is rotated by a wheel 37. The armature 26' of the motor 27' operates a gear 38 driving the pointer 39 of a dial indicator 40.

In order to tune the radiant energy system to receive waves of a particular frequency, the distant operator may rotate wheel 37, thereby shifting the arm of switch 35 across successive contacts thereof. In the position of the switch indicated in Fig. 1, namely, with the arm of the switch on contact 34, magnets 30' and 30 of motors 27' and 27 are energized by battery 36. The armatures of the motors then take the positions illustrated. If wheel 37 is rotated to the left until the arm engages with contact 33, the armatures of motors 27' and 27 will assume the positions indicated in Fig. 2. If the switch arm is still further rotated to engage with contact 32, the motor armatures take the positions illustrated in Fig. 3. If rotation of wheel 37 is continued in the counter-clockwise direction, motors 27' and 27 continue to rotate in step also in a counter-clockwise direction. However, if wheel 37 should be rotated in a clockwise direction, the motor armatures are likewise rotated in this direction. It is thus seen that the movable plates of condenser 12 and the pointer of indicator 40 will be rotated simultaneously. The operator is thus enabled to determine the amount of adjustment that has been made.

The signal modulated waves received by antenna 11 cause corresponding potentials to be impressed upon the control electrode of the tube 15. In a manner well understood there is produced in the output circuit of this tube, waves having variations corresponding to the modulations carried by the received waves. Condenser 19 provides a path of low impedance to components of carrier frequency in the output circuit. Condenser 24 is provided as a means to prevent the production of parasitic oscillations by virtue of the capacity between the control electrode and anode of tube 15. Signal potentials are impressed upon the input circuit of tube 21 by transformer 17 and amplified signal currents are repeated in the output circuit of this tube, whereby the receiving device 22 is operated.

The radiant energy transmitting system of Fig. 4 comprises a source of signals 45, an amplifier 50, and an oscillator 55 supplying energy to an antenna 60. Source 45, which may be an ordinary microphone transmitter, is connected to a transformer 46 in such manner as to impress potentials varying in accordance with signals upon the input circuit of amplifier 50. This input circuit is connected between the control electrode and cathode of a piece discharge tube 51. The output circuit of tube 51 is connected to its cathode and anode and supplies energy to the anode circuit of a second space discharge tube 56 forming a part of the oscillator 55. A source 52, herein shown as a battery in series with a choke coil 53 supplies space current to the tube 51 and also to the tube 56. A high frequency choke coil 57 is arranged to prevent the passage of oscillatory currents from the circuits of tube 56 through coil 53 and battery 52. An output path for high frequency oscillations is provided by condenser 58 in series with coil 59 connected between the anode and cathode of tube 56. An input circuit is connected between the cathode and control electrode of tube 56 and includes a leak path including a resistance 61 shunted by a blocking condenser 62 which is in series with the coil 63.

The input and anode circuits of tube 56 are coupled in feed back relation by an antenna circuit including the coils 64, 65 and 68 of the variometer 66. Coils 64, 68 and 65 are connected in series between the antenna 60 and ground. Coil 68 is wound upon a rotatable core 69 attached to a shaft 67 by which coil 68 may be rotated with respect to coils 64 and 65. The shaft 67 may be connected to the gears 25 of a remote control system, such as described in connection with Fig. 1, whereby the tuning of the antenna circuit may be controlled from a distant station.

The system of Fig. 4 is arranged to operate in accordance with the method disclosed in patent 1,442,147, R. A. Heising, issued January 16, 1923. The detailed operation will therefore not be described herein.

Although this invention has been described in connection with certain specific embodiments, it is intended to be limited only by the scope of the appended claims.

What is claimed is:

1. In a system for the reception of radio signals, a variable tuning element, means including an electric motor for effecting an adjustment of said tuning element, means including a line connecting said motor in series with a second motor at a remote point for causing said second motor to operate in synchronism with said first mentioned motor, means at said remote point associated with said line for determining the amount of adjustment of said motors, and an indicating device also at said remote point under the control of said second motor for indicating the adjustment of the tuning element.

2. In a system for the reception of radio signals, a variable tuning element, means including an electric motor for effecting the adjustment of said tuning element, and means at a remote point for determining the adjustment of said tuning element, said means at said remote point including another motor in series with said first mentioned motor, and an indicator operated by said last mentioned motor in accordance with the adjustment of said tuning element.

3. In a system for the reception of radio signals, a tuning element, means including an electric motor for effecting an adjustment of said tuning element, a line connecting said motor in series with a motor at a remote point, means at said remote point associated with said line for determining the adjustment of said motors and means including an indicating device at said remote point operated by the motor thereat and under the control of said line for indicating the adjustment of the tuning element.

4. In a system for the reception of radio signals, a variable tuning element, an electric motor for effecting an adjustment of said tuning element, means including a second electric motor at a remote point for indicating the amount of adjustment of said tuning element, a line connecting said motors in series so as to cause the armatures of said motors to rotate synchronously, and means in the line for controlling movemet of said motors in unison.

5. In a system for the reception of radio signals, a variable tuning element, a step-by-step electric motor comprising a plurality of electromagnets and an armature for effecting an adjustment of said tuning element, means including a second step-by-step electric motor comprising a plurality of electromagnets and an armature at a remote point for indicating the amount of adjustment of said tuning element, line conductors connecting the electromagnets of said first mentioned motor in series with the corresponding electromagnets of said second motor, and means including a switch located at said remote point for closing the circuit of the line conductor connecting corresponding electromagnets of the respective motors in succession to cause synchronous rotation of the armatures of said motors.

In witness whereof, I hereunto subscribe my name this 29th day of February, A. D. 1924.

RAYMOND A. HEISING.